United States Patent [19]

Jonte et al.

[11] 4,285,649

[45] Aug. 25, 1981

[54] PROTECTION SYSTEM FOR PART MOLDING MACHINES

[76] Inventors: Patrick B. Jonte, 1932 Perry Lake Rd., Ortonville, Mich. 48462; John K. Biener, 8620 Waumegah Rd., Clarkston, Mich. 48016

[21] Appl. No.: 95,689

[22] Filed: Nov. 19, 1979

[51] Int. Cl.³ .............................. B29F 1/14; B29F 1/00
[52] U.S. Cl. ..................................... 425/137; 264/40.1
[58] Field of Search .......................... 425/137; 264/40.1

[56] References Cited

U.S. PATENT DOCUMENTS 4,023,044  5/1977  Miller .................................. 307/116

FOREIGN PATENT DOCUMENTS 84920  5/1971  German Democratic Rep. ..... 425/137

*Primary Examiner*—Thomas P. Pavelko
*Attorney, Agent, or Firm*—Krass, Young & Schivley

[57] ABSTRACT

A protection system for monitoring the operation of a part molding machine which ejects the part from the molds after successful completion of the molding process. A plate is disposed beneath the mold for receiving the parts after they are ejected. A transducer mounted on the plate provides a spectrum of signals having different frequencies when the part impacts the plate. The amplitude of these signals at particular frequencies depend upon the part being made by the machine. A frequency generator is used to selectively provide a reference frequency signal associated with the particular part being made. A tone decoder compares the reference frequency signal with the signals from the transducer and provides an output signal if the amplitude of the transducer signals at the reference frequency exceeds a predetermined level. If the output signal from the tone decoder is not generated further operational cycles of the machine are prevented thereby protecting the mold from being damaged by a part which has not been fully ejected.

17 Claims, 10 Drawing Figures

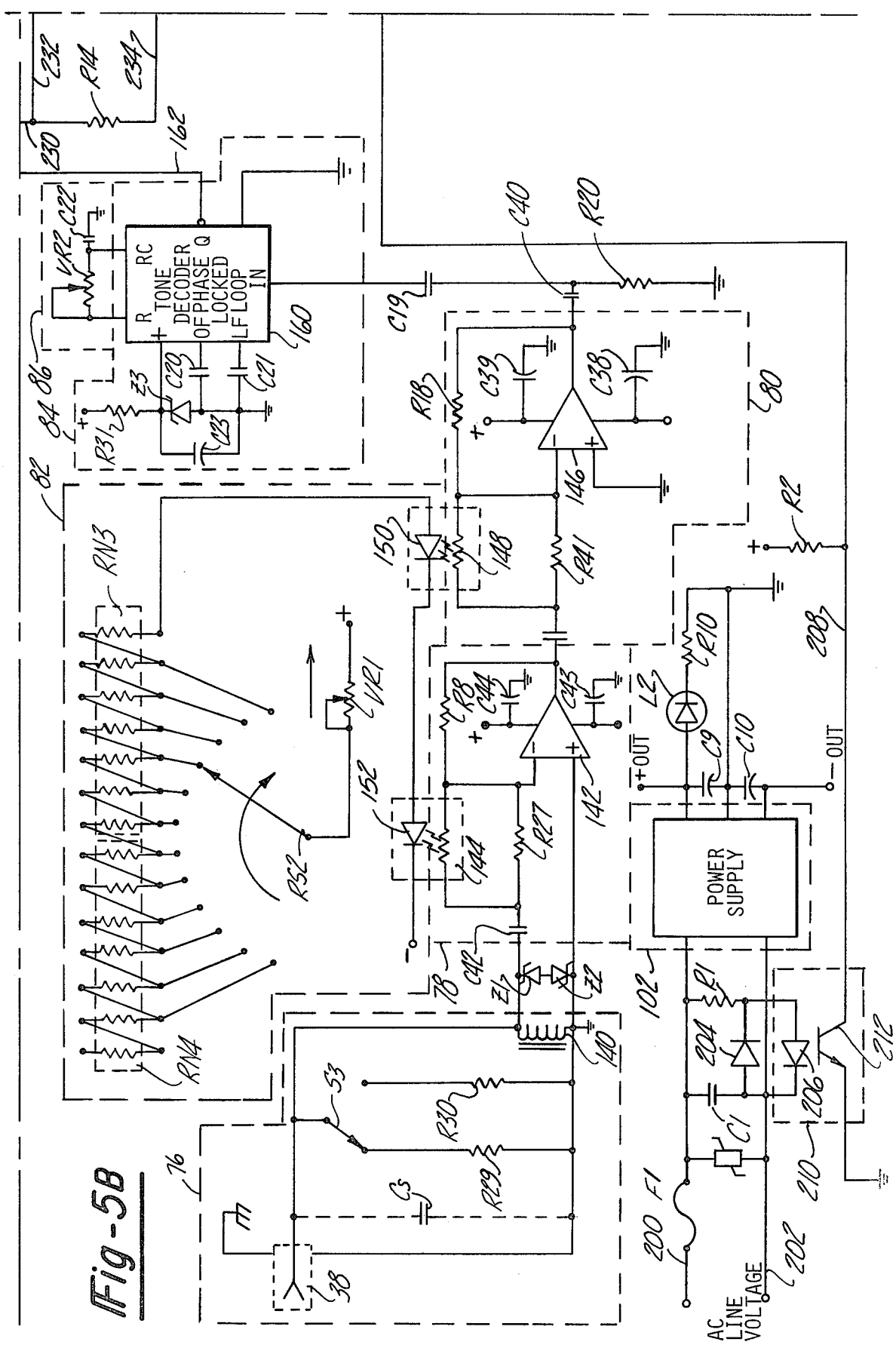

PROTECTION SYSTEM FOR PART MOLDING MACHINES

BACKGROUND OF THE INVENTION

This invention relates to part molding machines. More particularly, it relates to a system for monitoring the operational cycles of the machine to protect it from damage.

Part molding machines using a multiplicity of molding techniques such as injection molding are enjoying increasing popularity for making a wide variety of parts. One of the most expensive components of these machines is the molds which are of intricate design and particularly adapted to form the desired part. Typically, these molds are formed of two parts which are clamped together and filled with a liquid plastic whose configuration is defined by the mold. After the plastic is hardened, the molds are opened and the part is ejected from the molds.

One of the problems which is encountered in use of these part molding machines is that the molded part often is not fully ejected from the mold. Many of these machines are fully automated such that after a predetermined time the molds are automatically closed to begin another operational cycle. However, if a part or portion thereof has not cleared the mold, the hardened part can cause damage to the molds when they are again closed. Since it is imperative that the molds maintain their precise configuration, they cannot be reused, lest they form a deformed part, and must be repaired. This necessitates a large amount of down time, not to mention the repair of the relatively expensive molds.

Photoelectric devices have been used in the past to detect whether the parts have been ejected from the molds. Generally, a light beam is directed across the open faces of the molds and the transmitted light is monitored by a photocell. This arrangement has a variety of drawbacks. During ordinary machine usage, grease, oil, and other matter has a tendency to collect on the receiving face of the photocell thereby preventing proper operation. Moreover, the large amount of heat generated by the molds tend to degrade the solid state operational characteristics of the photocells. Furthermore, the photocell arrangements must be individually adapted to the shape of the molds where parts of different configurations are to be made. Since it is important to insure that the molds are completely free of hardened debris, relatively intricate photocell arrangements must be utilized to detect remnants of the part left in the mold.

SUMMARY OF THE INVENTION

According to the teachings of the present invention, a plate is disposed for receiving the parts after they are ejected from the mold. Transducer means, coupled to the plate, provides a spectrum of signals having different frequencies upon detection of a part impacting the plate. The amplitude of said signals at particular frequencies depend upon the type of part being made by the machine. Selector means are provided for generating a selected reference frequency signal associated with a particular part. Comparison means compares the selected reference frequency with the signals from the transducer. The comparator provides an output signal if the amplitude of the transducer signals at the selected frequency exceeds a predetermined level. Control means prevents further operational cycles of the machine if the output signal is not generated, thereby protecting the molds from being damaged by a part which has not been fully ejected. In the event the output signal is not generated within a given time period, an alarm is activated indicating parts have not fully ejected. The system of the present invention is easily adapted to existing machines and can be readily adapted to sense an almost unlimited number of different parts with exceptional accuracy and long life. The system may be used in either fully automatic or semi-automatic operation. In semi-automatic operations, the operator's response time is monitored and an alarm activated if the machine is not cycled within a predetermined time. Additional aspects of this invention include provision of a part or shot counter and a cycle run timer so that management can monitor the productivity of the machine.

A further feature of this invention is the provision of a unique timing control signal which can be used to drive either a digital counter or a typically used electromechanical timer without the need for further circuit modification.

BRIEF DESCRIPTION OF THE DRAWINGS

These and other advantages of the invention will become apparent upon reading the following specification and by reference to the drawings in which.

DESCRIPTION OF THE PREFERRED EMBODIMENT

Figure 1:
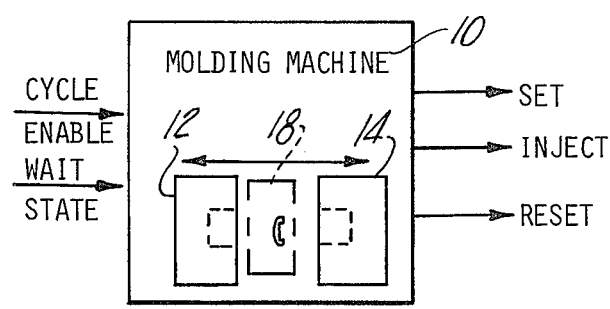
FIG. 1 is a view schematically illustrating a typical part molding machine in use with the system of the present invention.

The present invention finds particular utility in connection with monitoring the processes of a part molding machine 10 which is shown in simplified form in FIG. 1. In particular, molding machine 10 may be an injection molding apparatus which includes complimental molds 12 and 14 in which their respective hollowed out portions define the shape of part 16 in a manner wellknown in the art. Machine 10 may either be of a fully automated or semi-automated type. In the fully automated mode, the closing/opening of the molds, injection of the plastic, and ejection of part 16 is controlled by internal machine circuitry (not shown). Typically, the machine circuitry provides a SET signal which is at a high level when the molds are opening and transcends to a low level when the mold carriage is fully opened, e.g. as detected by a limit switch. A high level INJECT signal is generated by the machine when the molds are closed and plastic is being injected into the molds. A RESET signal may be provided in a fully automated machine by pressing a button on the machine to enable further machine operation after the completion of the current cycle. In the semi-automated mode, molding machine 10 is equipped with a door 18 as shown diagrammatically by the phantom lines in FIG. 1. In this mode, the operator is required to open the door after the mold has opened and remove the part from the mold. A limit switch on the door can be provided and coupled to the RESET line such that it will enable further machine operation when the door is opened and then shut. Although certain features of this invention have applicability to a semi-automatic type machine, it has primary utility in a fully automated machine.

According to the preferred embodiment of this invention, a plate 20 is disposed beneath the mold to receive part 16 when it is ejected from machine 10. Plate 20 may conveniently be oriented at an angle so that the part 16 may roll off onto a conveyor for further processing. Plate 10 is preferably of a rigid material such as aluminum or steel and is mounted on a table 22 which may be an extension of machine 10. Any suitable supporting surface will suffice. Plate 20 is accoustically isolated from table 22 by sandwich mountings 24 and 26. In the preferred embodiment, mountings 24 and 26 are formed of neoprene rubber and are attached by opposed, but spaced, mounting screws 29,30 and 32,35, respectively. The purpose of mountings 24 and 26 is to isolate plate 20 from extraneous accoustically or mechanically generated vibrations in the surrounding environment. Sandwich mountings from Lord Kinematics, part No. J-4624-53, have successfully been used.

Figure 2:
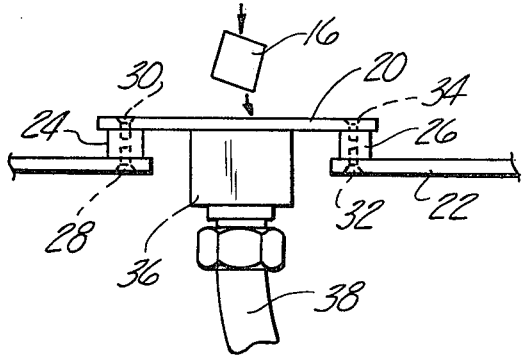
FIG. 2 is a sectional view of the transducer of the preferred embodiment of this invention.
Figure 2:
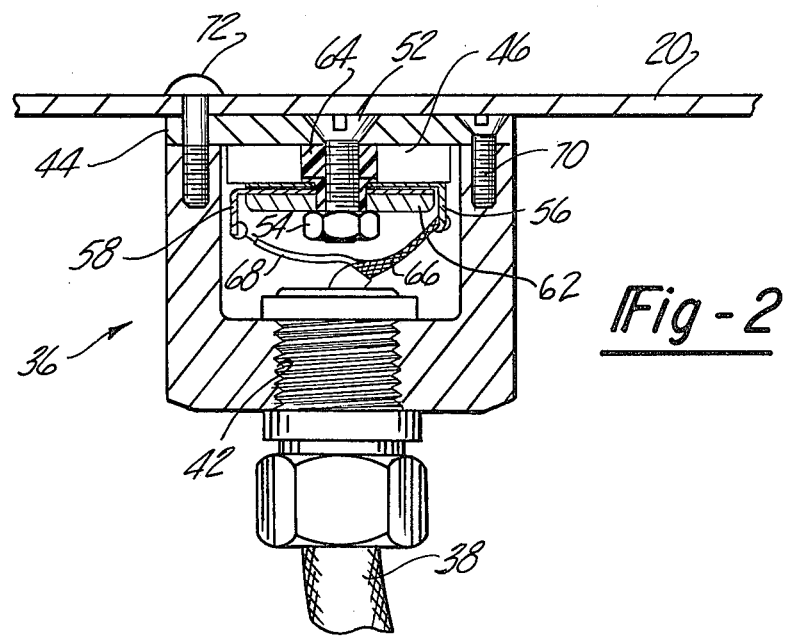
Figure 3:
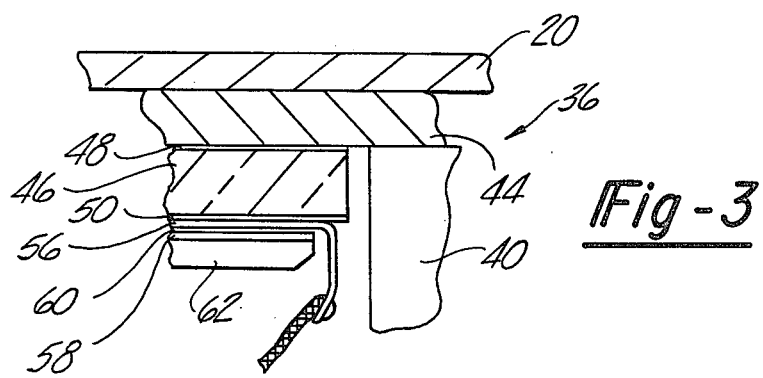
FIG. 3 is an enlarged sectional view with parts cut away showing the electrical contacts of the transducer shown in FIG. 2.

Transducer 36 is affixed to the lower surface of plate 20 and senses the impact of part 16 with plate 20. Transducer 36 is electrically connected with the to be described circuitry by way of shielded cable 38. The details of transducer 36 are shown in FIGS. 2 and 3.

Transducer 36 includes a hollow metallic housing 40 having a lower threaded opening 42 for receipt of cable 38. A cover 44 provides an interface between plate 20 and piezoelectric crystal 46. Crystal 46 includes conductive silver electrodes 48 and 40 on opposing major surfaces. Crystal 46 is rigidly attached to cover 44 by flathead cap screw 52 and nut 54. As can be seen most clearly in FIG. 3, a brass conductive ring 56 contacts electrode 50. Ring 56 is spaced from a similar brass conductive ring 58 by way of a mylar insulator 60. A conductive retaining washer 62 completes the assembly in which a plastic tubular insulator 64 electrically isolates the shaft of cap screw 52 from the remaining elements. Cable lead 66 is electrically connected to conductive ring 56 to form the electrical contact to crystal electrode 50. The electrical contact to the crystal electrode 48 is conveniently made by leads 68 which is coupled to electrode 48 by way of washer 62, nut 54, cap screw 52 and cover 44 all of which are made of electrically conductive materials. Flathead cap screw 70 serves to attach cover 44 and its depending components to housing 40. Housing 40 is rigidly attached to plate 20 by way of buttonhead cap screw 72 which passes through openings in plate 20, cover 44 and housing 40 as can be seen in FIG. 2.

Housing 40 and its associated components provide a rigid construction for loading crystal 46. Crystal 46, in the preferred embodiment, is a ceramic disc made of lead-zirconate and lead-titinate. It can be purchased commercially from the Vernitron Piezoelectric Division of Bedford, Ohio. In this loaded condition, crystal 46 serves as a mechanical to electrical transducer. In the present invention, transducer 36 converts the mechanical energy imparted by part 16 dropping onto plate 20 into electrical energy which is ultimately transferred from housing 40 by the leads 66, 68 and cable 38. The electrical energy which is generated is in the form of a spectrum of electrical signals of different amplitudes and different frequencies.

Figure 4:
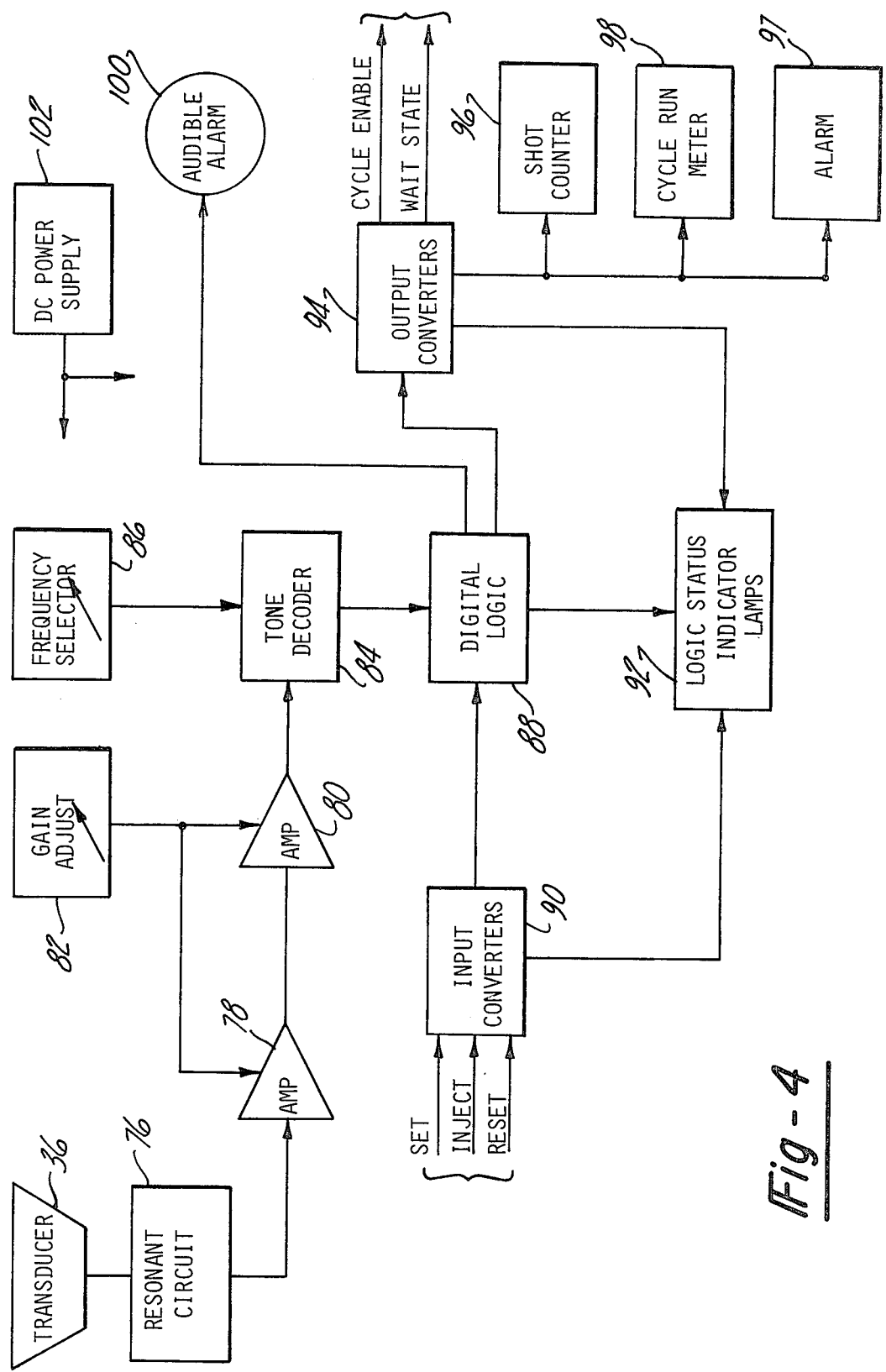
FIG. 4 is a block diagram of the electronic circuitry of a preferred embodiment of the present invention.
Figure 6:
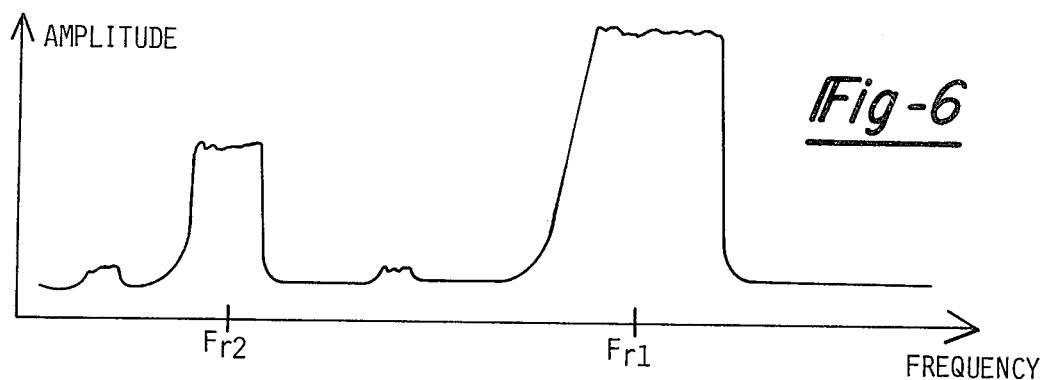
FIG. 6 shows examples of two waveforms illustrating the frequency spectrums generated by different parts.

Turning now to FIG. 4, the output of transducer 36 is coupled to a resonant circuit 76 which is electrically tuned to the physical properties of the crystal 46. A simplified representation of the expected output of the resonant circuit 76 is shown in FIG. 6. The two graphs of FIG. 6 show the amplitude of the output signals as a function of frequency. This frequency spectrum generally includes several resonant nodes, two of which are shown in FIG. 6 and labeled as $F_{r1}$ and $F_{r2}$. The frequencies and amplitude levels of these nodes will depend on a variety of different factors. However, one of these factors is the characteristics of the part 16 which impacts the transducer 36. The two graphs in FIG. 6 are representative of frequency spectrums which can be expected from different parts of varying resiliency, weight, etc. It can be seen that the amplitude of the signals around the frequency $F_{r1}$ of the one part is much greater than that of the other part. It is a feature of this invention that the system has the capability of advantageously utilizing these different frequency spectrum characteristics to provide an optimum detection scheme.

Referring back to FIG. 4, the output of the resonant circuit 76 is coupled to an amplification network including series connected amplifiers 78 and 80 whose gain is controlled by a gain adjusting arrangement 82. The amplification network provides a very large range of gain which facilitates detection of a wide variety of different parts which will later be more fully discussed herein.

The amplified signals provided one input to tone decoder 84. The other input to tone decoder 84 is a frequency selector circuit 86 which provides a reference frequency associated with the characteristics of the part to be sensed. Briefly, tone decoder 84 is a phase locked loop system which compares the two frequencies and provides a digital output signal if the amplitude of the transducer signal at the preselected frequency exceeds a predetermined level.

The output of tone decoder 84 is coupled to a digital logic circuit 88 which also receives control signals from machine 10 via input converters 90. Logic status lamps 92 are controlled by logic circuitry 88 and input converters 90 to provide visual indications of the machine system status. As will be more fully described in connection with FIG. 5, digital logic 88 includes a timer which is initiated by the beginning of the machine cycle. If the output signal from the tone decoder 84 is not received, logic circuitry 88 will provide suitable output signals which prevent further operational cycles of machine 10. Such a signal is represented by the WAIT signal line which is coupled to logic circuitry 88 via output converters 94. If the output signal from the tone decoder 84 is not received within a predetermined time period, an audible alarm 100 may be provided to provide an audibly sensible indication that the part has not been fully ejected from the molds. Conversely, if the appropriate signal has been received, the CYCLE ENABLE signal line will be activated to enable the machine 10 to continue its processing. A part or shot counter 96 and cycle run timer 98 are also controlled by logic circuitry 88. The block diagram is rounded out by a power supply 102 for supplying the necessary power to the components of the circuitry.

Figure 5A:
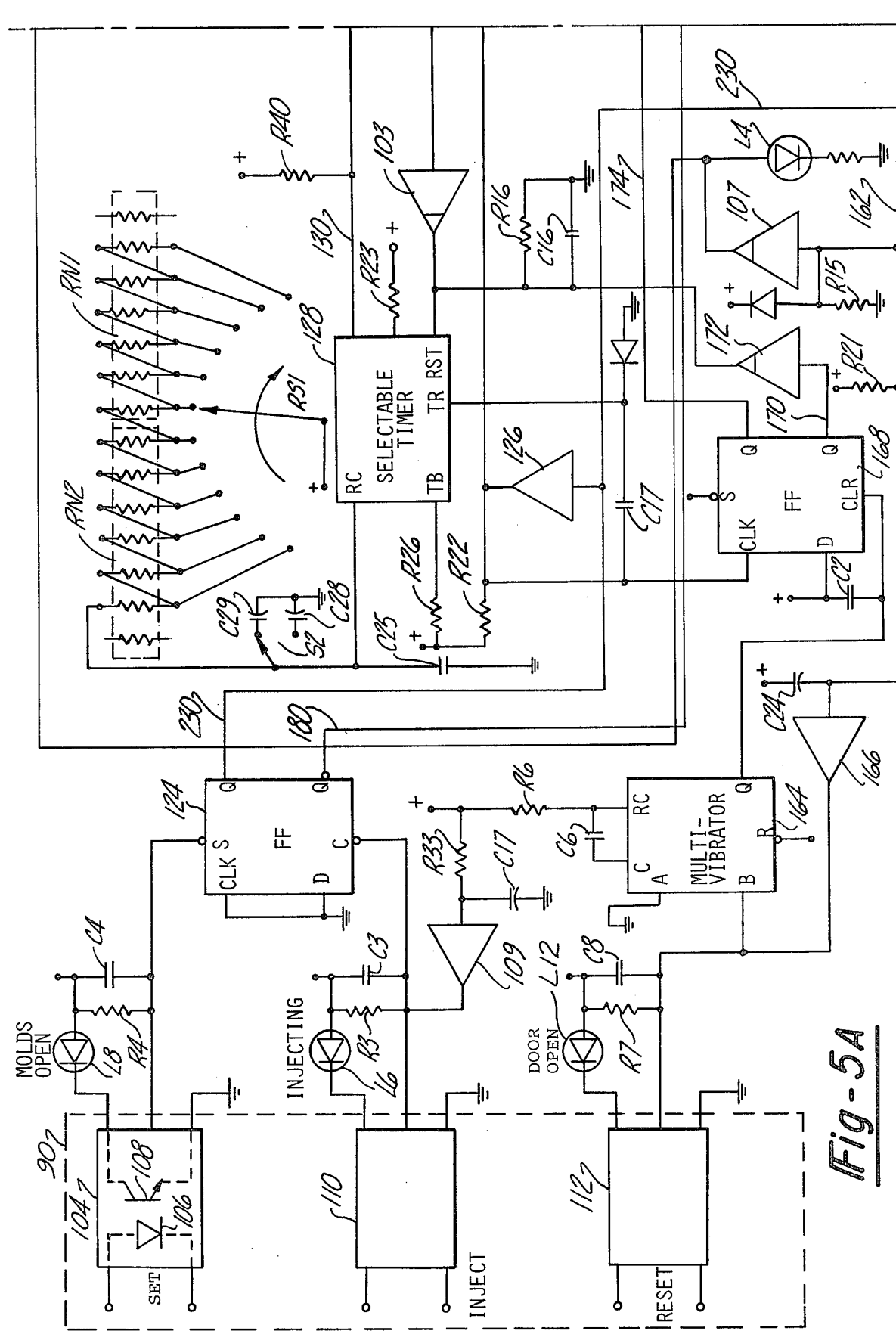
FIGS. 5 (A-D) is a detailed schematic of the electrical circuitry shown in block diagram form in FIG. 4, with FIG. 5D showing the arrangement of FIGS. 5 (A-C)
Figure 5C:
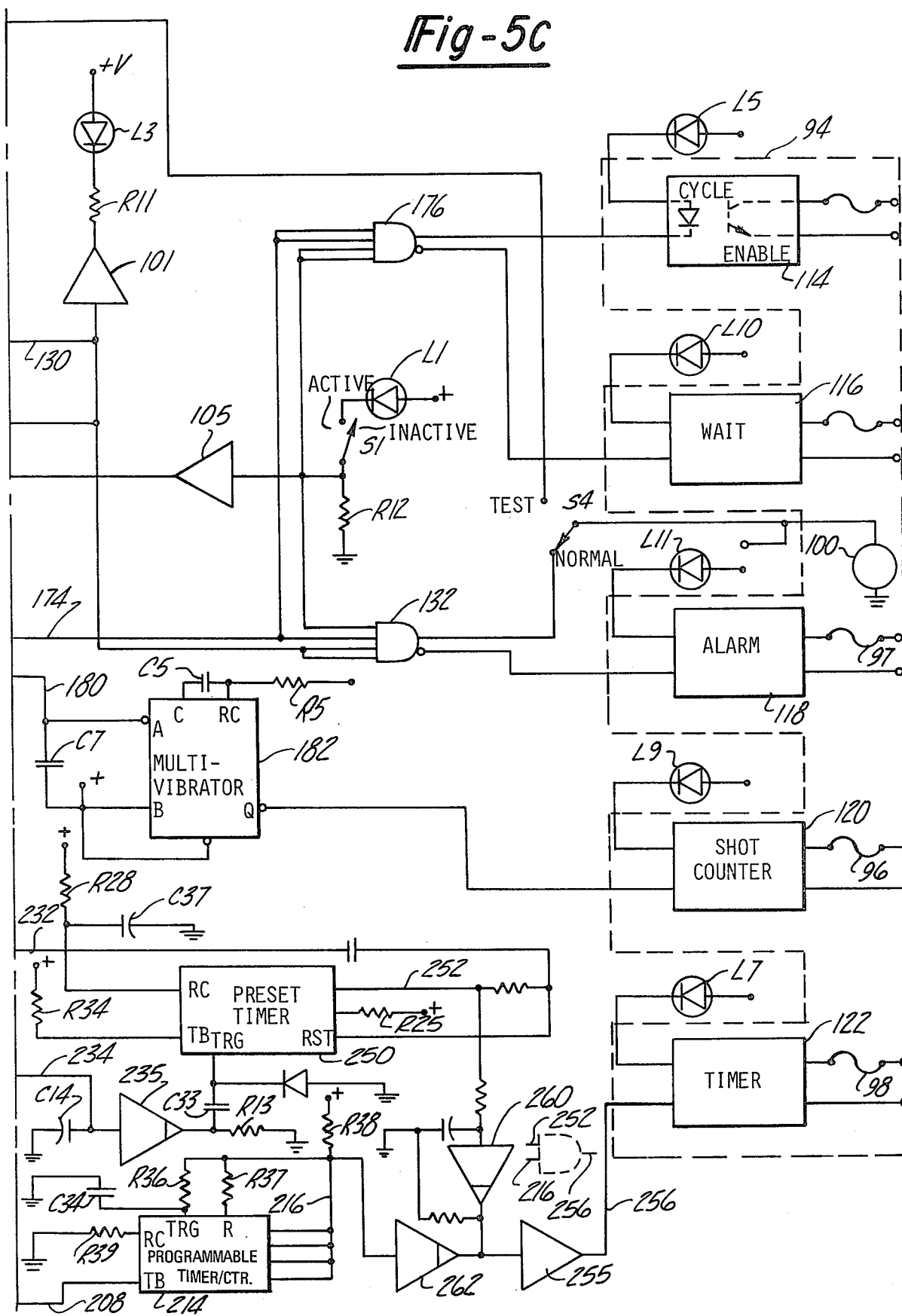
Figure 5D:
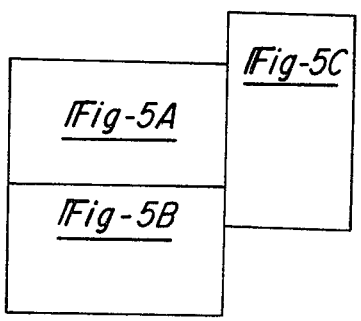

FIG. 5 shows the details of the functional blocks as shown in FIG. 4. To aid the reader in following the description, the circuit components making up the functional blocks are encompassed by dotted lines, with the exception of digital circuit 88 and lamps 92 which comprise the remaining circuit components which are unencompassed.

When the machine molds 12 and 14 are open, machine 10 generates a SET signal which is coupled to the input of input converter 104. (See FIG. 5A) Converter 104 typically may include a light emitting diode 106—phototransistor 108 arrangement which isolates the incoming signal from the digital logic to minimize noise as is known in the art. Specific examples of these converters are AC or DC input modules and AC or DC output modules as manufactured by Gordos under the tradename Input/Output modules. The remainder of input converters 110, 112 and the output converters 114-122 are similar in construction. All of the input/output converters invert the incoming signals in this embodiment although this is not critical provided that suitable corrections to the logic circuitry be made to account for different states of the generated signals. The SET signal, indicating that the molds are open, activates lamp L8 and sets flip flop 124. The Q output of flip flop 124 is coupled to the input of buffer 126 which charges capacitor C17 to a level which triggers timer 128. Timer 128 is effectively a down counter which provides an output signal when a predetermined time period has elapsed after being triggered. In the preferred embodiment, this time period is selectively variable by the setting of switch RS1 which connects a varying amount of resistance, provided by resistor banks RN1 and RN2 with a capacitance, determined by the setting of switch S2, to provide an RC time constant for timer 128. The values of the resistors and capacitors can be varied to supply a wide variety of different time periods. In the preferred embodiment, the timer 128 output on line 130 goes low, i.e. provides a logical zero state upon triggering. The low level on line 130 is connected to one input of AND gate 132 (See FIG. 5C). The low level on line 130 inhibits AND gate 132 so that its output does not activate alarm converter 118 or the optional audible alarm 134. The logical zero level on line 130 also caused the alarm delay lamp L3 to be activated.

If a part is not sensed impacting plate 20 before timer 128 times out, timer output line 130 will go high or to a logical 1 level which turns off alarm delay lamp L3 and places a logical 1 on the input to AND gate 132. The other inputs to gate 132 are initially set to a logical 1 state so that upon receipt of a logical 1 state on line 130, AND gate 132 is enabled thus providing an output signal which turns on alarm converter 118, associated lamp L11 and the optional audible alarm 134. It should be noted that a variety of different warning devices may be connected to the outputs from alarm converter 118. A test switch S4 is provided where, in the test mode, the alarm 134 will be activated by tapping on plate 20 thereby checking for proper operation.

The part impacting plate 20 is sensed via transducer 36 which sends its signals over cable 38. As can be seen in FIG. 5B, resonant circuit 76 includes a LC tank network including inductor 140 in parallel connection with resistors R29 or R30 (depending on the position of switch S3), and the static capacitance $C_s$ inherent to the physical properties of crystal 46. Typical values for resistors R29 and R30 are 3 Kohm and 10 Kohm to effect the attenuation of the electrical signals. In the preferred embodiment the inductance of coil 140 is approximately 10 mh. The function of coil 140 is to filter out low frequency signals, preferably those below 10 KHz. In this embodiment, the output from resonant circuit 76 generally conforms to that shown in FIG. 6 in which one frequency node is approximately 50 kilohertz and the other frequency node at about 30 kilohertz. The frequency spacing of the two nodes can be altered somewhat by changing the inductance of coil 140. Pursuant to one aspect of this invention, the transducer 36 and the system circuitry operates at ultrasonic frequency levels, i.e. above 20 KHz. Accordingly, the system is insensitive to audible sounds such as human voices near the area of machine 10.

Referring back to FIG. 5B, devices Z1 and Z2 provide a protective overload circuit for the internal system components.

Special attention is drawn to the amplification network consisting of amplifiers 78, 80 and gain adjustment circuitry 82. It is a feature of this invention that this amplification network provides an extremely large range of gain, in this example, being about from 1 to 600. This is extremely important, if the system is to be able to detect a wide variety of parts. For example, if a sprue weighs 1/10 of an ounce and it contains a number of one ounce coffee cups, the gain should be set so that the coffee cups would, and the sprues alone would not, trigger the system. Otherwise, a sprue may fall out but the cups remain in the mold and the system may falsely detect that a part has been dropped. Equally important is the ability to change the gain without creating noise or other interference which may degrade accurate gain selection.

These problems are solved by way of two series connected amplifiers in which the gain adjustment circuity is electrically isolated from the amplifiers. In particular, amplifier circuit 78 includes an operational amplifier 142 and associated filtering capacitors C43 and C44. As known in the art, the gain factor of such operational amplifiers are determined by the values of the feedback resistor R8 and the amplification factor resistor connected to the input of the amplifier. According to this invention, the amplification factor resistance is comprised of resistor R27 and a parallel coupled photoresistor 144. Similarly, amplifier circuit 80 includes an operational amplifier 146, associated filter capacitors C39 and C40, a feedback resistor R18, and an amplification factor resistive network comprising resistor R41 and parallel coupled photoresistor 148.

The gain selection is made by gain adjustment circuit 82 which includes a series connected bank of resistor elements RN3 and RN4 for supplying selective resistive values depending upon the position of the wiper of a switch RS2. Gain adjustment circuitry 82 includes a source of positive potential coupled to a variable resistor VR1 and the pole switch RS2. The wiper of switch RS2 thus connects a selected amount of resistance provided by resistor banks RN3 and RN4 to include same in a series network with two series connected photodiodes 150 and 152. The amount of light emitted from photodiodes 150 and 152 is a function of the resistance in the circuit as supplied primarily by the position of switch RS2. For example, if switch RS2 is positioned such that large amounts of resistance is selected, the current flow through photodiodes 150 and 152 will be reduced, thus providing lower light emission. In such instances, the resistances of photoresistors 144 and 148 are very large and effectively are open circuits. In such case the amplification factor resistance is determined solely by the relative resistance values of the feedback resistor and the amplification resistor. In this embodiment, the feedback resistor and amplification resistor are each about 100 K. Accordingly, the gain factor of the series connected amplification network would be about 1. However, when switch RS2 is adjusted so that more current can flow through photodiodes 150 and 152, the resistance of the associate photoresistors decrease and effect the parallel combination which forms the amplification factor resistance. Hence, a wide variety of gain factors are provided. The series connected between amplifier networks 78 and 80 cause the overall gain to be one multipled by the other. For example, if switch RS2 is selected such that the parallel combination of photoresistor 144 and resistor R27 (and similarly photoresistor 148 and resistor R41) provides a resistance of 10 kilohms, the gain factor of each amplification network 78 and 80 is 10, but the resultant gain would be 100.

It is important to note that the gain adjustment circuitry 82 is electrically isolated from the amplification network 78 and 80 by way of the photodiode-photoresistor modules. Hence, noise which is inherent with a switching arrangement such as switch RS2 is filtered from the high gain amplification networks 78 and 80. The gain of these networks is thus not adversely effected by the noise and voltage spikes which might otherwise be amplified to such a high level that they would degrade circuit operation.

Turn now to the tone decoder 84 and frequency selector 86 shown in FIG. 5B. Tone decoder 84 employs a phase lock loop circuit component 160 which accepts the incoming signals from amplifier 80 at its IN input. It compares the frequencies of the incoming signal with a reference frequency determined by frequency selective circuitry 86. Selective circuitry 86 conveniently employs a variable resistor VR2 and capacitor C22 which provides an RC time constant which determines the reference frequency. If the frequency of the incoming signal substantially matches the reference frequency and the amplitude of the incoming signal exceeds a predetermined level for a given time period, component 160 provides a given output signal on output line 162. In this embodiment, the output signal is a logical zero or low level. As is known in the art, the limit levels of the amplitude and time periods are generally determined by the particular characteristics of the tone decoder which is set by the manufacturers, although these limits can be varied somewhat by the circuitry comprised of capacitors C20 and C21 which are coupled to the loop filter (LF) and output filter (OF) pins, respectively. In the preferred embodiment, the minimum input amplitude level is about 20 mV and the lock-up time period is about 300μ seconds. A suitable tone decoder is that which is commercially available from Signetics as component number 567 Tone Decoder Phase Lock Loop.

The logical zero level from tone decoder 84 when a match is detected triggers multivibrators 164 through buffer 166 (FIG. 5A). Multivibrator 164 provides a pulse which clears flip flop 168 which provides a logical zero output on its $\overline{Q}$ line 170 which, in turn, is inverted by buffer 172 to provide a high level to the timer reset input which resets timer 128. Therefore, if the part if detected before timer 128 times out, timer 128 is reset so that it will not activate the alarm.

When flip flop 168 is cleared upon detection of the part, its Q output goes high on line 174 which is coupled to an input of AND gate 176 (FIG. 5C) which provides a high signal to CYCLE ENABLE converter 114 and lights indicating lamp L5. The complimental output of AND gate 176 thus goes low and disables the WAIT converter 116 and its associated lamp L10. Since the timer 128 is reset under these conditions its output line 130 is low thereby disabling AND gate 132.

An override switch S1 provides other inputs to AND gates 132 and 176 and does not disturb the aforementioned circuit operation unless it is in an inactive position in which case the entire protection system is disabled and the machine is free to run without mold protection.

Regardless of the condition of timer 128, lamp L4 (FIG. 5B) is lit when tone decoder 82 detects a part and provides the output signal over line 162. In such manner, system operation may be readily detected merely by tapping on plate 20 to see if lamp L4 is energized thereby indicating proper system operation.

If the system is used in the semi-automated mode, the operator is required to open door 18 and remove the part from the mold. As noted above, the door 18 is provided with a limit switch which detects the position of the door. When the door is opened and closed, the limit switch provides a signal over the RESET lines to reset converter 112. Timer 128 is activated in the same manner as in the automatic mode described above. However, since the operator removes the part, the part impact detection portion of the system is not activated. Instead, the signal over the RESET line activates lamp L12 when the door is open and, thereafter, when the door is subsequently shut the multivibrator 164 is triggered on the rising edge of the generated pulse. Flip flop 168 is toggled and the timer 128 reset in the same manner as described above if the door is opened and shut within the selected time period. If the operator does not perform this feat within the preselected timer period, the timer 128 times out and activates the alarm.

In either the semi-automatic or fully automatic mode, shot counter 96 is incremented only upon occurrence of successive SET and INJECT signals, the successive receipt of which define a complete operational machine cycle. Receipt of these two signals cause flip flop 124 to be set and then cleared. This toggle action causes a transition from low to high on the $\overline{Q}$ output line 180. This transition triggers multivibrator 182 which, in turn, provides an output signal on its $\overline{Q}$ output line to increment shot counter 96 connected to converter 120 and activate lamp L9. In such manner, a running tally of the number of operational cycles of machine 10 is kept by shot counter 96.

One of the features of this invention is that the output timer converter 122 may be utilized to drive either an electronic digital counter or an electromechanical timer. Typically, an electromechanical timer operates from a synchronous motor which is energized by a continuous AC input signal, whereas a digital counter is incremented on the transition of an incoming DC pulse. Whatever device is utilized, it should be directly related to the time that the machine is in operation, as compared to real time in which the machine may not always be in use.

In FIG. 5B, AC line voltage is received over input lines 200, 202 where diodes 204 and 206 provide a half-wave rectifier network to generate a 60 hertz signal on line 208. Transients on AC line voltage are filtered by way of photomodule 210 in which diode 206 is of the light emitting type for optically coupling the half-wave rectified signal to phototransistor 212. The AC line voltage is directly coupled to a power supply 102 which provides the necessary biasing voltages for the circuit components in a manner well-known in the art. Lamp L2 indicates proper operation of power supply 102.

The 60 hertz line 208 is coupled to programmable timer/counter 214 (FIG. 5C). The 60 hertz line provides a time base for the timer/counter 214. On the rising edge of the 60 hertz time base signal the output from counter 214 on line 216 goes high which subsequently resets counter 214 through resistor R37 coupled to the reset input. The amount of time in which line 216 remains high is dependent on the RC time constant derived from resistor R36 and capacitor C34 coupled to the trigger input of counter 214. By chosing the values of resistor R36 and C34 so that the RC time constant is very fast, the output of counter 214 on line 216 will remain high for only a very short period of time. Preferably, this timer period is approximately 1 millisecond and is derived in this embodiment by assigning capacitor C34 with a 0.1 microfarad capacitance and resistor R36 with a 100 kilohms resistance value. Accordingly, the combination of 60 hertz time base derived from normal AC line voltage and the programmable counter 214 provides effectively a 99% duty cycle in which a pulse width of one millisecond is generated every one second of real time. Programmable timer/counter may be that distributed by Exar of Sunnyville, Calif. as component number XR2240.

A preset timer 250 similar to timer 214, is adapted to provide a blocking signal on line 252 if it times out before being reset and retriggered. In this embodiment, timer 250 is programmed to time out within about five minutes. This is accomplished as known in the art by appropriate values of the components attached to the time base (TB) and resistor-capacitor (RC) inputs to timer 250. Timer 250 is triggered upon the toggling of flip flop 124 (FIG. 5A). The rising edge of the Q output 230 caused by successive SET and INJECT signals from machine 10 is coupled through resistor R14 and line 234 through buffer 235 to the trigger input of timer 250. Buffer 235 effectively buffers the signal such that the rising edge of the pulse triggers timer 250 thus restarting the beginning of the programmable timer period.

The buffer arrangement including buffers 260 and 262 effectively form a logical AND gate such as that shown in the dotted line adjacent thereto. One of the inputs is from programmable timer/counter 214 which provides the timing control signals. The other input is the output of timer 250 which serves as an enabling or blocking signal. In the preferred embodiment, this logical AND function is performed by buffers 260 and 262 having inputs 252 and 216, respectively. These buffers are hex open drain P channel buffers which are commerically available from National Semiconductor as MM74C907 components. The other triangular representations in the drawing also represent similar types of buffers, those without the crossbar at the nose portion representing N channel buffers such as National components MM74C906. Thus, it can be seen that the output 256 coupled through buffer 255 will depend upon the states of the input signals. Ordinarily, while timer 250 is timing, the timing control signals on input 216 pass through on line 256 to the timer converter 122. However, when timer 250 times out indicating that the machine is no longer being operated, the ANDing function is disabled and the timer converter 122 does not receive any further control signals.

Figure 7:
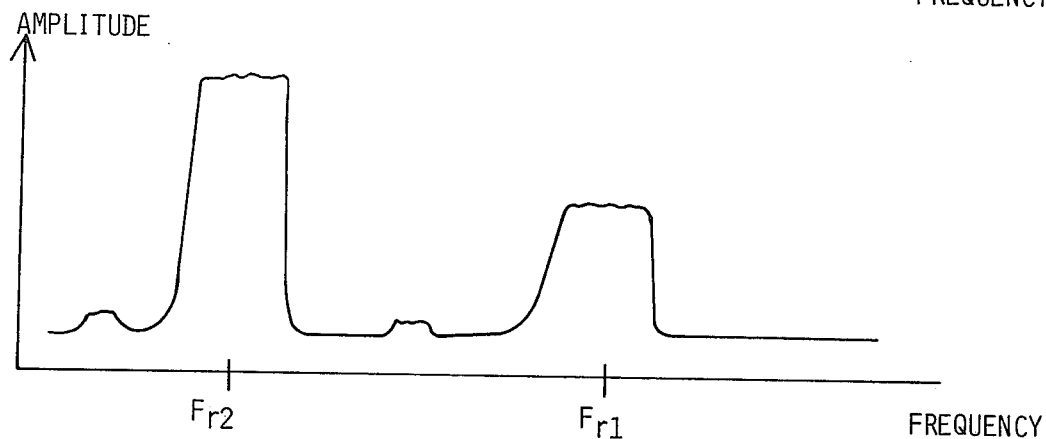
FIG. 7 is a waveform timing diagram of the timer control circuit portions of the preferred embodiment.
Figure 7:
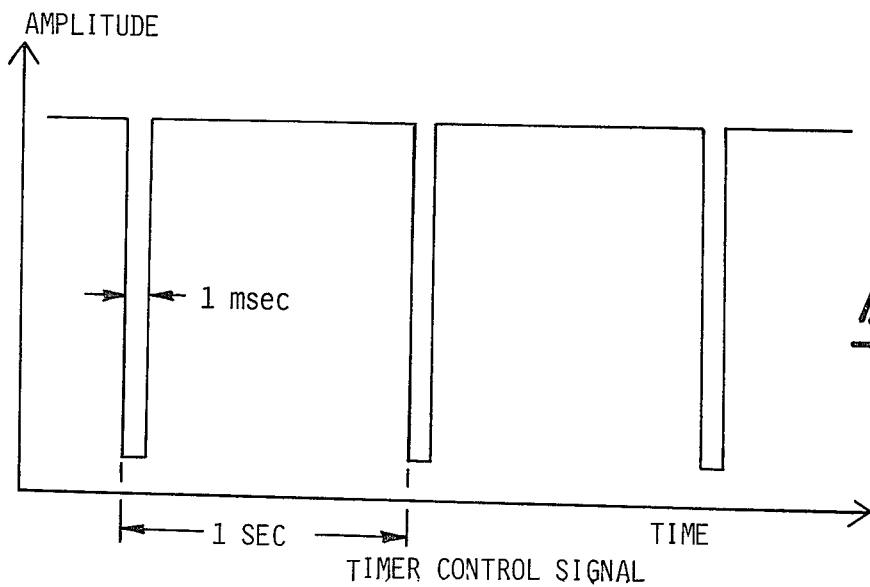

The wave-form representation of the timer control signals that are normally generated at the output of converter 122 is shown in FIG. 7. Hence, it can be seen that one feature of this invention is the provision of a timer control circuit which provides an indication of the amount of time that the machine is actually being used. Management can easily calculate the productivity of the machine by reference to the contents of part or shot counter 96 as a function of the cycle run timer 98. Another unique advantage of the timer control circuitry is that timer 98 may either be of the digital type or an ordinary electromechanical timer. The timer control signal provides a pulse for incrementing a digital counter such as those distributed by Kesler/Ellis of Atlantic Highland, N.J. as Model No. KO8.22-H12-B-1-1-BB-60 hertz. On the other hand, the pulse duration for incrementing the digital counter is of such short time period that it does not adversely effect the operation of typical electromechanical timers.

In typical operation of the device, as soon as the power from power supply 102 is turned on, capacitor C17 charges up after a period of time and provides a signal through buffer 109 to flip flop 124 which reinitializes the logic of the system circuitry. When used with a fully automated machine, gain adjustment circuitry 82 is set according to the characteristics of the part being made by machine 10. The system is extremely accurate and is not adversely effected by electrically noisy environments since it detects part 16 by way of the frequencies and the amplitude of the signals generated by transducer 36. If the system merely detected a signal having an amplitude above a certain threshold level, an erroneous indication of the part being dropped may be generated by transients in the electrical system, vibration caused by the machine operation, as well as other factors which are present in the normal working environment.

It should be understood that although this invention has been described in connection with specific examples thereof as required by the Patent Office, obvious modifications will become apparent to one skilled in the art when practicing this invention. With this in mind, the scope of the protected invention should be ascertained by the language of the following claims although equivalents of the elements set forth therein will also become obvious after reading the foregoing specification.

The embodiments of the invention in which an exclusive property or privilege is claimed are defined as follows:

1. A protection system for monitoring the operation of a part molding machine which ejects the part from the molds after successful completion of the molding process, said system comprising:
   a plate for receiving the parts after they are ejected from the molds;
   transducer means coupled to the plate, operative to provide a spectrum of signals having different frequencies and amplitudes upon detection of a part impacting said plate, the amplitude of said signals at particular frequencies depending upon the characteristics of the parts being made by the machine;

selector means for generating a selected frequency signal associated with the parts currently being made by the machine;

comparison means for comparing said selected frequency with the signals from the transducer means, operative to provide an output signal if the amplitude of the transducer signals at the selected frequency exceeds a predetermined level; and control means for preventing further operation cycles of the machine if said output signal is not generated thereby protecting the molds from being damaged by a part which has not been fully ejected.

2. The system of claim 1 wherein said transducer means provides output signals at frequencies in excess of 20 kilohertz to thereby render the system insensitive to audible sounds near the machine.

3. The system of claim 2 wherein said transducer means comprises a piezoelectric element rigidly mounted on the plate.

4. The system of claim 3 wherein said piezoelectric element is a ceramic disc made of lead-zirconite and lead-titanate.

5. The system of claim 1 which further comprises:

timer means having a trigger input, a reset input, and an output;

means for coupling a machine cycle control signal to the trigger input of said timer means to initiate timing thereof;

means connecting said comparison means to the reset input of said timer means, operative to stop the timing thereof; and means for selecting a predetermined time period which must elapse before said timer means provides an output signal at its output wherein said timer means provides said output signal upon timing out unless reset before said selected time period has elapsed.

6. The system of claim 5 wherein said comparison means comprises a tone decoder which provides a digital output signal for resetting said timer means.

7. The system of claim 1 which further includes an amplification network interposed between the transducer means and the comparison means, said amplification network comprising:

an amplifier having an input and an output;

a feedback resistor coupled between the input and the output;

an amplification factor determining resistive network coupled to the input of said amplifier, said network including an optically responsive variable resistor element; and a gain selector circuit including a light emitting device optically coupled to said variable resistor element, and means for varying the light emitted from said light emitting device to thereby alter the resistance of said amplification factor determining resistive network for varying the gain of said amplifier.

8. The system of claim 7 wherein said light emitting device is a light emitting diode and wherein said variable resistor is a photoresistor.

9. The system of claim 7 which includes two substantially identical series connected amplification networks.

10. The system of claim 1 which further comprises: a shot counter for providing an indication of the number of operational cycles of the machine.

11. The system of claim 10 wherein said machine cycle is defined by movement of the molds and injection of plastic into the molds, and wherein said system further comprises:

means for sensing the position of the molds and providing a set signal as a function thereof;

means for sensing the injection of the plastic into the molds and providing an inject signal as a function thereof; and means for incrementing said counter only upon successive receipt of said set and inject signals.

12. The system of claim 11 which further comprises:

flip flop means having set and clear inputs, said set signal from the machine being coupled to said set input, and the inject signal from the machine being coupled to said clear input; and multivibrator means coupled to an output of said flip flop operative to provide a control signal for incrementing said shot counter upon a transition of the flip flop output signal derived from sequential receipt of said set and inject machine signals.

13. The system of claim 1 which further comprises: run cycle timer means for providing a visual indication of the time that the machine has operated.

14. The system of claim 13 which further comprises:

timer control means for providing a control signal for driving said run cycle timer; and enable timer means for disabling said run cycle timer if the machine is not cycled within a predetermined time period.

15. The system of claim 14 which further comprises bi-stable means activated by machine status signals and wherein the output of said bi-stable means reinitializes the time period of said enable timer upon receipt of machine status signal indicating that the machine is being used.

16. The system of claim 14 wherein said timer control means comprises:

means for generating a generally continuous timer control signal which includes a transition pulse of a sufficiently small time period that said control signal may be utilized to drive either a digital or electromechanical timer.

17. The system of claim 16 wherein said timer control means comprises:

a programmable timer having a time base input coupled to a 60 hertz signal and means for providing about a 1 millisecond pulse every second of real time.

* * * * *